W. B. HARSEL.
STITCHER ROLL.
APPLICATION FILED FEB. 7, 1917.
1,438,158.
Patented Dec. 5, 1922.
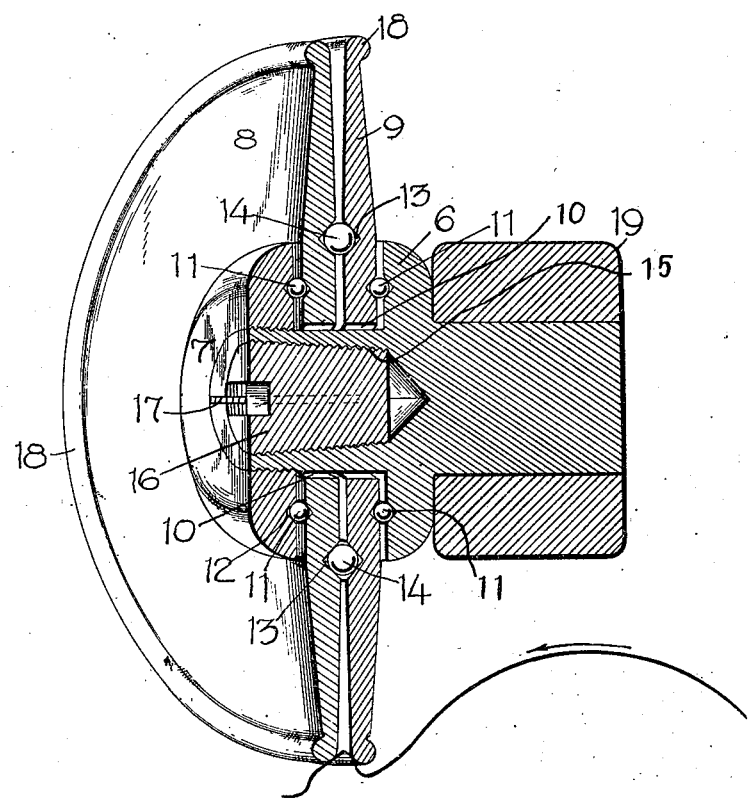
Inventor
William B. Harsel.
Witness
R. F. Trogner.
By C. L. Landon
Attorney.

Patented Dec. 5, 1922.

1,438,158

UNITED STATES PATENT OFFICE.

WILLIAM B. HARSEL, OF AKRON, OHIO, ASSIGNOR TO THE GOODYEAR TIRE & RUBBER COMPANY, OF AKRON, OHIO, A CORPORATION OF OHIO.

STITCHER ROLL.

Application filed February 7, 1917. Serial No. 147,178.

*To all whom it may concern:*

Be it known that I, WILLIAM B. HARSEL, a citizen of the United States, residing at Akron, in the county of Summit and State of Ohio, have invented new and useful Improvements in Stitcher Rolls, of which the following is a specification.

My present invention relates to stitching devices for laying down the fabric plies, during the building up of a pneumatic tire carcass.

According to modern methods of manufacture, pneumatic vehicle tires are laid up upon a ring core ply by ply, each ply being stitched down in close conformity with the core which it annularly envelops. A pair of stitching devices are customarily employed to operate upon opposite sides of the carcass from the center of the tread to the bead portion, the stitchers rotating in contact with the revoluble core and being gradually moved around their halves of the tire cross-section in radial fashion from crown to bead until the entire fabric ply operated upon has been laid into complete conformity with the building core.

I have discovered that results secured in stitching down fabrics upon their cores vary in accordance with the particular type of stitcher employed. Frequently a single stitching of a carcass is not sufficient to lay the ply exactly and firmly into its place in the tire carcass, owing to the development of wrinkles or to the lack of adhesion between the ply and the core or between the ply and a previously applied ply. In many instances these flaws require manual labor on the part of the tire builder in stitching down those portions of the ply which are found to be incorrectly applied. Particularly is this the case in the tire areas adjacent the beads of the opposite tire toes, since the bead line forms an annular ridge upon each side of the carcass which the stitcher wheel must surmount. As the ordinary single disk stitcher wheel is able only to lay the fabric in entire conformity with this bead line on one side of the ridge at a time, it is of frequent occurrence that a faulty and insecure laying of the ply across the bead results.

In view of these conditions, it has been one of the principal objects of this invention to provide a stitcher roll formed of a pair of stitching disks adapted to cover adjacent areas of the carcass fabric with which the roll is in contact.

It is another object of the invention to provide a stitcher roll composed of a plurality of stitching disks which are independently mounted for rotation in contact with the carcass fabric to be stitched, the rolls being preferably of slightly varying diameters in order that they may straddle the ridge formed by the lateral apex of the bead to advantage, and thus stitch down the carcass fabric simultaneously on both sides of this bead ridge.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

In the drawings illustrating a preferred embodiment of the invention:

The figure is a sectional perspective view of a stitcher-roll embodying the features of my invention.

The preferred form of stitching device contemplated herein includes a shank or arm 5 provided with a fixed bearing annulus 6 between which and a removable bearing annulus 7 are positioned the stitcher disks 8 and 9. Each of these disks is provided with a central aperture 10 which loosely surrounds the extremities of the arm 5, the disks being supported within the channel provided by the spaced bearing annuli 6 and 7 by means of antifriction bearings 11 which are arranged within suitable complemental ball races or channels 12 formed in the respective facing walls of the disks and their bearings.

A similar pair of ball races 13 provides a channel between the adjacent faces of the disks 8 and 9 themselves, and serve to seat antifriction bearings 14 which permit the independent rotation of the disks with respect to each other. The outer extremity of the arm 5 is formed with a conical cavity 15 provided with internal screw threads for the accommodation of the expanding member 16. The walls of the cavity 15 are transversely slotted in the manner indicated by the numeral 17 in order to permit the outward expansion of the arm extremity upon introduction of the member 16 into the cavity. The removable bearing annulus 7 is exteriorly threaded upon the extremity of the arm 5 and is firmly wedged into position by means of the member 16. In this manner the pressure of the various ball channels upon their bearings 11 and 14 may be adjusted and maintained to an exact degree.

The stitching disks 8 and 9 are preferably of slightly different diameters and are each provided with a circumferential bead edge 18. The larger disk of the two laterally follows the smaller disk around the cross-sectional periphery of the tire carcass on the revoluble core 20, in the direction indicated by the arrow, as the two proceed along the tire circumference side by side in an ever-narrowing spiral. This larger disk is adapted to contact with the outer portion of the annular bead ridge when the stitcher roll is straddling the lateral apex line of the bead, the parts being then in the position chosen for illustration.

The mentioned faults in the present practice are overcome by employment of the stitcher device proposed by the present invention, since the independently revoluble stitcher disks provide for a double stitching of each portion of the carcass periphery with which the device engages. Particularly noticeable is the improvement in laying successive plies of a tire carcass over the ridge provided by the tire beads, since the material is simultaneously compressed and formed around the outer bead edge on both sides of the ridge provided by the lateral apex of the bead. Moreover, by providing a compound stitcher wherein one of the stitching disks follows the other in its cross-sectional path around the tire carcass, a much more effective laying of the various plies in conformity with the core upon which the tire is builded results, inasmuch as any portion of the ply which is insecurely stitched down by the passage of the first disk 8 thereover is restitched into place by the following disk 9.

It is to be understood that the shank 5 of the stitcher roll may be mounted upon any supporting means 19 and that its movement about the cross-sectional periphery of the carcass may be controlled manually or in any mechanical manner which suggests itself as being desirable.

What I claim is:

1. In a tire-making machine, a stitching unit comprising a plurality of rotatable stitching disks arranged side by side and having a common axis, and means for supporting the disks in permanently spaced-apart relation for movement over the surface of a tire while in peripheral contact therewith, whereby one disk follows the other from the crown to the base of the tire.

2. In a tire-making machine, a stitching unit comprising a pair of rotatable stitching disks arranged side by side and having their axes alined, and means for supporting the disks for movement over the surface of a tire in peripheral spaced-apart contact therewith from its surface to its base, whereby the material on the tire may be twice stitched as one disk follows the other.

3. In a tire-making machine, a stitching unit comprising a plurality of stitching disks arranged side by side and with their axes alined and in permanently spaced-apart relation, and a shank for supporting the disks for movement over the surface of a tire in peripheral contact therewith, whereby one disk follows the other from the crown to the base of the tire.

4. In a tire-making machine, a stitching unit comprising a pair of stitching disks of different diameters, arranged side by side in permanently spaced-apart relation and with their axes in approximate alinement, and means for supporting the disks in peripheral contact with an associable tire while traversing it from its crown to its base whereby the material on the tire may be twice stitched by the successive operation of the disks.

5. In a tire-making machine, a stitching unit comprising a pair of stitching disks arranged side by side in spaced-apart relation, and means, including a shank, for supporting the disks in a constantly spaced-apart relation and with their axes in approximate alinement while in peripheral contact with a tire from its crown to its base, and whereby the disks are caused to straddle the bead of the tire when they reach the same.

6. In a tire-making machine, a stitching unit comprising a pair of disks of different diameters arranged side by side, and a shank for supporting the disks in spaced-apart relation during their peripheral contact with the tire, which they are adapted to traverse from the crown to the base, whereby the smaller disk precedes the larger and both disks straddle a bead on the tire when the disks reach the bead.

7. In a tire-making machine, a stitching unit comprising a pair of freely-rotatable stitching elements having continuous and uninterrupted peripheries, and a support on which the disks are arranged in parallelism and in cooperatively close, but spaced-apart relation and actuatable for moving the elements from the crown to the base of the tire.

8. In a tire-making machine, a stitching unit comprising a pair of freely-rotatable stitcher elements of relatively different diameters, and a support on which the elements are mounted in parallelism and in spaced-apart relation, and operable for moving said elements over the surface of the tire from its crown to its base, whereby one element tracks the other across the surface of one side of the tire, both elements simultaneously engaging the tire.

9. A stitching unit for traversing the side of a carcass-forming core, including a support and a pair of stitcher elements associated in co-operatively close but spaced-apart relation on the support and freely rotatable thereon in approximate parallelism, and means for rotatably spacing the elements apart.

10. A stitcher roll including a plurality of stitching disks, antifriction means mounting the separate disks and antifriction means separating the disks.

11. A stitcher roll including a plurality of stitching disks; antifriction means similarly mounting the respective disks for rotation; and antifriction means spacing the disks for independent rotation thereof.

12. A stitcher roll including a plurality of stitching disks; an arm; a fixed bearing carried by the arm; a removable bearing carried by the arm; a pair of stitcher disks mounted between the bearings and antifriction means separating the disks for independent rotation.

13. A stitcher roll including a plurality of stitching disks; an arm; a fixed bearing carried by the arm; a removable bearing carried by the arm; a pair of stitcher disks mounted between the bearings; antifriction means separating the disks for independent rotation and means for adjusting said removable bearing upon said arm and for maintaining it in the adjusted position.

14. A tire-stitching unit for tire-making machines including a plurality of stitching members, and means for supporting said members in spaced-apart relation and for independent contact with the surface of a tire, said means including a support common to the members, bearing elements between the support and the members, and bearing elements between the members.

In testimony whereof I have signed my name in the presence of two subscribing witnesses.

WILLIAM B. HARSEL.

Witnesses:
  B. J. McDanel.
  C. L. Landon.